3,455,733
SURFACE SHEETS IMPREGNATED WITH BUTYL-
ATED MELAMINE-FORMALDEHYDE RESIN
Billy E. Lloyd, Sanford, Maine, Israel S. Ungar Baltimore,
 Md., and Richard R. Krumel, Hopewell, Va., assignors
 to Allied Chemical Corporation, New York, N.Y., a cor-
 poration of New York
No Drawing. Filed July 21, 1965, Ser. No. 473,863
Int. Cl. C08c 17/16; C09d 3/36; D21h 1/10
U.S. Cl. 117—155                                5 Claims

ABSTRACT OF THE DISCLOSURE

A cellulosic sheet is impregnated with a blend of bu-tylated melamine-formaldehyde resin and oil-modified alkyd resin, dried and then partially cured. An acid catalyst may be added to the resin blend. Continuous impregnation of the sheet is possible due to short cure times. The impregnated sheets are used for surfacing of laminates.

This invention relates to the production of laminates. More particularly, it relates to the production of surface sheets for laminates, which sheets comprise a cellulosic substrate impregnated with a blend of a butylated melamine-formaldehyde resin and an oil modified alkyd resin.

It is known to produce laminates using various blends of triazine-aldehyde resins and alkyd resins as the surfacing and/or impregnating resin. However, the use of these various resin blends has been accompanied by certain disadvantages. For example, alkyd modified melamine-formaldehyde resins, although desirable in terms of availability and cost, have heretofore exhibited a tendency to craze and crack or to be dull due either to the incompatibility of the resins or to the gasification of materials such as alkylating agents used in rendering the resin mixtures compatible. Although it is suggested that crazing and cracking may be avoided by the use of alkyd modified triazine-aldehyde resins other than melamine formaldehyde, such resins are less readily available and add significantly to the cost of the final product.

It is, therefore, an object of the present invention to provide a method for producing high quality laminates. It is another object to produce such laminates at a cost which is relatively low.

It is a more particular object of this invention to provide a method for producing resin impregnated sheets which exhibit a high degree of crack and craze resistance and are ideally suited for the surfacing of laminates. It is another object to produce these sheets in a continuous manner.

These and other objects which will be apparent hereinafter are achieved by a process which comprises impregnating a thin sheet of cellulosic material with a blend of a butylated melamine-formaldehyde resin and an oil modified alkyd resin, said resin blend containing about 1.5 to about 4 parts by weight alkyd resin per part by weight of melamine-formaldehyde resin; drying the impregnated sheet at elevated temperature; and heating the dried sheet at temperatures above the drying temperature, but preferably below about 275° F., until the resin is partially cured and non-tacky.

The oil modified alkyd resin may be any of a number of such resins which are compatible with alkylated melamine-formaldehyde resins. They are conventionally prepared by reacting a saturated or unsaturated polycarboxylic acid, such as succinic, glutaric, adipic, pimelic, suberic, phthalic, terephthalic, maleic and fumaric acids, their esters or anhydrides, with a polyhydric alcohol such as ethylene glycol, diethylene glycol, dipropylene glycol, sorbitol, glycerol, pentaerythritol and the like or a mixture of such acohols. It may be either a short, medium or long oil modified alkyd resin, the oils being those conventionally used for such purposes, such as castor oil, linseed oil, corn oil, coconut oil, cottonseed oil and olive oil. Various degrees of fluidity may be achieved by dissolving the alkyd resins in a suitable organic solvent.

A typical procedure for the preparation of an oil modified alkyd resin suitable for use in the present invention is as follows (hereinafter parts are by weight if not otherwise indicated):

PREPARATION OF OIL-MODIFIED ALKYD RESIN

About 320 parts of coconut oil and 100 parts of glycerol are charged to a resin kettle. Heat and agitation are applied and mixture is sparged with an inert gas. When the temperature reaches about 355° F., 2 parts of calcium naphthenate are added. Temperature is increased to about 455–465° F. Samples are taken and heating is discontinued when methanol miscibility becomes greater than 3 parts methanol: 1 part alkyd by weight. Twenty to forty minutes is usually sufficient for proper alcoholysis. The reaction mixture is then cooled to about 355° F., and 410 parts phthalic anhydride, 15 parts maleic anhydride and 155 parts of glycerol are added. Temperature is raised to about 445° F. and heating is continued until the acid number approaches 6.5, as determined by taking samples at intervals. Average time for reaction is 4–5 hours. Finally, the reaction mixture is cooled to about 200° F. and 670 parts of xylene are added and reaction mixture is filtered.

The butylated melamine-formaldehyde resin may likewise be one which is conventionally used in the laminating art. It should contain about 2 to 6 mols of formaldehyde per mol of melamine. Preparation of such resins is well known and is illustrated by the following description:

PREPARATION OF BUTYLATED MELAMINE-FORMALDEHYDE RESIN

To a solution of 158 parts of paraformaldehyde in 800 parts of n-butanol are added one part of 85% phosphoric acid and 126 parts of melamine. The mixture is stirred and refluxed for forty-five minutes after solution is completed. The resin is neutralized with triethanolamine, 630 parts of butanol are added and the mixure is distilled until the water is removed. Finally, 100 parts of xylene are added to give a solution containing 60% resin.

The resins are thoroughly blended, preferably at 60° to 105° F., to form a mixture, preferably containing 65% to 80% by weight alkyd resin. The consistency of the final product may be predetermined by using alkyd and melamine-formaldehyde resins of certain fluidity, or it may be adjusted by the addition of a suitable organic solvent during or after the blending of the resins. The solvents employed should volatilize at a temperature below that at which the resin blend cures. A solution having a resin content of about 40 to 60 wt. percent and a viscosity of about 200 to 3000 centipoises is best suited for the present invention.

A conventional acidic or potentially acidic catalyst such as organic or inorganic acids or an amine salt of such acids may be added to the resin blend. Of course, one of the blended resins may already contain such a catalyst. Various pigments may also be incorporated in the resin blend prior to its use as an impregnant.

The cellulosic substrate used is preferably one containing about 30% to 100% by weight of alpha cellulose.

The conditions under which the impregnation of cellulosic material is carried out are those conventional in the art, e.g. by passing the material through a solution of the resin blend and then between rollers to remove excess resin solution. Best results are achieved by maintaining the temperature of the resin blend during impregnation in the range 80° to 105° F. and by introducing the substrate into the resin solution for a period of about 1 to 10 seconds. These factors are, of course, dependent upon the thickness and density of the cellulosic material being treated. It is desirable to control the impregnation so that the final dried product will contain about 25 to 80 weight percent resin.

The curing of the resin is carried out in two phases. In the first or drying phase sufficient heat is applied to the resin impregnated sheet to volatilize any solvent present without hardening of the resin. In this way the entrapment of gases is avoided and the excellent appearance of the final product is assured. Temperatures in the range 150° to 210° F., preferably 175° to 200° F., are generally used. The time required for this phase depends on the amount of solvent and the thickness and density of the cellulosic substrate, but is usually about 20 to 180 seconds. In the second phase, the resin impregnated sheet is heated at a higher temperature, in the range 210° to 325° F., preferably 210° to 275° F., to partially cure the resin and give a non-tacky sheet. This usually takes about 20 to 180 seconds.

The curing operation may be carried out in two separate heating zones at different temperatures or in one large heating zone having gradually increasing temperature from entrance to exit end.

A particular feature of the present invention is the speed with which curing of the resin blend can be effected. Average curing time of the resin blend including solvent removal, when used to impregnate cellulosic material is 3 to 8 minutes. This makes practical the continuous impregnation of paper.

The products obtained using the laminating material and process of the present invention are decorative or non-decorative surface sheets which after application to a substrate will be completely craze resistant to temperature cycling between 140° F. and −5° F. This material may be applied at relatively low pressures to produce a smooth wear-resistant weather-resistant coating.

The following examples illustrate preferred embodiments of this invention, but are not intended as limiting its scope.

Examples

*Example 1.*—A resin solution having a viscosity of about 2000 centipoises is prepared by throughly blending 18 parts of the butylated melamine-formaldehyde resin prepared as specifically described above, 46 parts of a commercial oil-modified alkyd resin prepared as described above and 8 parts of n-butanol. A continuous sheet of 3 mil thick alpha-cellulose paper having a weight of 30 pounds/3000 sq. ft. ream is conducted first through the resin at 95° F. for about 2 seconds, then between rollers for removal of excess resin solution, and then through a two-zone oven where the resin is cured until non-tacky. Residence time in Zone 1 at about 200° F. is 2.5 minutes, which is sufficient to remove excess solvent and dry the impregnated sheet, and in Zone 2 at about 235° F. is 2.5 minutes. This continuous process produces paper with resin content of 75 weight percent having the desired partial cure.

The paper thus produced is suitable for application as a clear, transparent protective coating on fiberboard, and is applied by spraying the board with the same resin as used for paper impregnation, overlying with a sheet of the impregnated paper and pressing at 150–300 p.s.i. and 284–320° F. for 3–5 minutes.

*Example 2.*—The resin system described in Example 1 is used to impregnate a 10 mil decorative paper which is continuously passed between rollers and through a two-zone oven. Oven temperature is 150°–160° F. in Zone 1 and 180°–240° F. in Zone 2. The paper remains in each zone 2.5 minutes. The resin content is 40%. This paper is applied as a decorative finish to bagasse in the manner set forth in Example 1.

*Example 3.*—The same resin system as in Example 1 is used to impregnate a kraft paper. Resin temperature is about 85° F. and retention time in Zone 1 at 175–207° F. is 2 minutes and Zone 2 at 210–245° F. 2 minutes. Resin content is 40% by weight. This paper is applied to bagasse and plywood in the afore-described manner and is suitable as a primer coat for subsequent painting.

The impregnated papers described in Examples 1–3, when applied to wood substrates, pass a six-cycle boil, freeze and bake accelerated aging test in accordance with ASTM 1036 without crazing or delaminating. After six months exterior weathering and 1500 hours is a Weather-Ometer, no sign of failure is observed.

*Example 4.*—A mixture is prepared containing 20 parts of butylated melamine-formaldehyde resin, 50 parts of a commercial short oil-modified resin ("Plaskon" Coating Resin 3120, dehydrated castor oil alkyd) and 9 parts n-butanol. A 3-mil alpha-cellulose paper is conducted through the resin at 85° F. Excess resin is removed by rollers and the paper passed through a two-zone oven where the resin is cured until non-tacky. Residence time in Zone 1 at about 200° F. is 2.0 minutes and Zone 2 at about 235° F. is 2.0 minutes. This procedure produces paper with resin content of 75 weight percent.

The paper thus produced is suitable for application as a clear protective coating on plywood or fiberboard, and is applied as set forth in Example 1.

ONE-STEP PROCESS FOR PRODUCTION OF LAMINATES

Mechanically fiberized wood pre-dried to 4–5% moisture is sprayed with urea-formaldehyde resin containing 20% wax in a tumbler. After this treatment, the mixture contains 10% resin solids and 2% wax. A mat 3′ x 3′ x 9″ is prepared using 15.5 pounds of the fiberized wood mixture and pre-pressed between caul plates using cold platens to a thickness of approximately one inch. After removal of pre-pressed mat, a sheet of imprgenated kraft of Example 3 is placed on one side of the mat and on the other side is placed a sheet of overlay consisting of a pigmented resin impregnated paper prepared substantially as described in Example 1 above, but containing 20 parts by weight of pigment per 30 parts resin in the resin system and heated at temperatures of 175° F. and 275° F. respectively. This lay-up, pre-pressed mat and resin impregnated paper, was pressed between caul plates using platens heated at 300 to 325° F., dielectric heating for 90 seconds and at 250 p.s.i. with a total press time of 4.5 minutes. The resulting low pressure laminate was approximately ⅞″ thick. This product is suitable for use as a prefinished exterior siding material. The pigmented overlay sheet can also be applied to plywood by hot press application as the glue between plys is being cured. In the case of application to soft wood plywood, it is preferred to use an underlay sheet between the wood and surface sheet. The underlay sheet serves to reduce "telegraphing" of the wood grain structure to the surface sheet.

We claim:

1. The process for continuously producing a sheet suitable for the surfacing of laminates which comprises continuously impregnating a sheet tof cellulosic material with an organic solution having a viscosity of about 200–3000 centipoises and containing about 40–60% by weight of a blend of a butylated melamine-formaldehyde resin, an oil modified alkyd resin and an acid catalyst, said resin blend containing about 1.5 to about 4 parts by weight alkyd resin per part by weight of melamine-formaldehyde resin, drying the impregnated sheet at temperatures of about 150° to 210° F. and heating the dried sheet at temperatures of about 210° F. to about 325° F. until the resin is partially cured and non-tacky, the total time for drying and heating the sheet being about 3–8 minutes.

2. The process of claim 1 wherein the resin blend contains 2 to 4 parts by weight alkyd resin per part by weight of butylated melamine-formaldehyde resin.

3. The process of claim 1 wherein the butylated melamine-formaldehyde resin contains 2 to 6 moles formaldehyde per mole of butylated melamine.

4. The process of claim 1 wherein the cellulosic material has an alpha cellulose content of at least 30% by weight.

5. The process of claim 1 wherein the resin blend is maintained at a temperature of about 80° to 105° F., during the impregnation.

References Cited

UNITED STATES PATENTS

| | | | |
|---|---|---|---|
| 2,726,177 | 12/1955 | Lew | 117—161 |
| 2,856,374 | 10/1958 | Bolton | 260—22 |
| 2,980,636 | 4/1961 | Culbertson et al. | 260—21 |
| 2,980,637 | 4/1961 | Culbertson et al. | 260—21 |
| 3,108,089 | 10/1963 | Ferstandig | 260—850 |
| 3,133,032 | 5/1964 | Jen et tal. | 260—21 |

WILLIAM D. MARTIN, Primary Examiner

M. LUSIGNAN, Assistant Examiner

U.S. Cl. X.R.

117—161; 156—335